US012570176B2

(12) United States Patent　　(10) Patent No.:　US 12,570,176 B2
Jarrige et al.　　(45) Date of Patent:　Mar. 10, 2026

(54) GATEWAY, SYSTEM AND METHOD FOR MANAGING THE CHARGE OF A PLURALITY OF VEHICLES IN AN ELECTRIC NETWORK

(71) Applicant: BULL SAS, Les Clayes-sous-Bois (FR)

(72) Inventors: Pierre Jarrige, Fontenilles (FR);
Sébastien Delautier, Tournefeuille (FR)

(73) Assignee: BULL SAS, Les Clayes-sous-Bois (FR)

( * ) Notice: Subject to any disclaimer, the term of this patent is extended or adjusted under 35 U.S.C. 154(b) by 600 days.

(21) Appl. No.: 18/296,001

(22) Filed: Apr. 5, 2023

(65) Prior Publication Data

US 2023/0331111 A1　　Oct. 19, 2023

(30) Foreign Application Priority Data

Apr. 19, 2022　(EP) ..................................... 22305574

(51) Int. Cl.
　*B60L 53/63*　　(2019.01)
　*B60L 53/67*　　(2019.01)
　*G06Q 50/06*　　(2012.01)
　*H02J 3/00*　　(2006.01)
　*H02J 3/32*　　(2006.01)
(52) U.S. Cl.
　CPC ............... *B60L 53/63* (2019.02); *B60L 53/67* (2019.02); *G06Q 50/06* (2013.01); *H02J 3/003* (2020.01); *H02J 3/322* (2020.01)
(58) Field of Classification Search
　CPC ...................................................... B60L 53/63
　USPC .......................................................... 320/109
　See application file for complete search history.

(56) References Cited

U.S. PATENT DOCUMENTS

| | | | | |
|---|---|---|---|---|
| 2011/0004358 A1* | 1/2011 | Pollack | ................... | B60L 53/65 |
| | | | | 700/297 |
| 2015/0094968 A1* | 4/2015 | Jia | ........................... | G05B 15/02 |
| | | | | 702/60 |
| 2017/0110895 A1* | 4/2017 | Low | ........................ | B60L 53/63 |

(Continued)

FOREIGN PATENT DOCUMENTS

| | | |
|---|---|---|
| EP | 3016238 A1 | 5/2016 |
| EP | 3939823 A1 | 1/2022 |
| WO | 2019153305 A1 | 8/2019 |

OTHER PUBLICATIONS

Search Report issued in EP22305574 on Oct. 14, 2022 (8 pages).

*Primary Examiner* — Yalkew Fantu
(74) *Attorney, Agent, or Firm* — ARC IP Law, PC; Joseph J. Mayo

(57)　　ABSTRACT

A method of managing a charge of a plurality of vehicles on a site, the site including a plurality of charging points and a gateway, the gateway being connected between an electricity grid of an electricity provider, configured to provide electricity to the gateway, and the plurality of charging points, the gateway including a controller and an electrical storage device that stores electrical energy. The method, operated by the controller, includes determining the electricity need of the plurality of charging points at a given time, if the electricity need of the plurality of charging points is greater than zero, determining the electrical consumption of the site, and if the electrical consumption of the site is greater than a predetermined site limit, providing electrical energy to the plurality of charging points using electricity at least partially received from the electrical storage device.

11 Claims, 3 Drawing Sheets

(56) References Cited

U.S. PATENT DOCUMENTS

| 2018/0241228 A1* | 8/2018 | Kemppainen | .......... B60L 53/65 |
| 2019/0168630 A1 | 6/2019 | Mrlik et al. | |

* cited by examiner

200

204

202

GATEWAY, SYSTEM AND METHOD FOR MANAGING THE CHARGE OF A PLURALITY OF VEHICLES IN AN ELECTRIC NETWORK

This application claims priority to European Patent Application Number 22305574.0, filed 19 Apr. 2022, the specification of which is hereby incorporated herein by reference.

BACKGROUND OF THE INVENTION

Field of the Invention

At least one embodiment of the invention relates to electrical charging of vehicles and, more particularly, to a gateway, a system and a method for managing the charge of a plurality of vehicles in an electrical network. The gateway, system and method according to one or more embodiments of the invention may advantageously be used to optimize the use of an electrical network and the electrical charge of vehicles using said network.

Description of the Related Art

Nowadays, there is a major trend for a conversion of vehicles to electricity to lower dependency to petrol and be more sustainable. Consequently, the volume of cars to be recharged daily will dramatically increase in the coming years.

This increase of electrical consumers recharging their batteries at the same time will stress the electrical grid and can endanger the industrial activities of some companies, as the electrical lines are today not sized to support this increase of demand.

A specific system to better manage the electricity demand along the business day is required to ensure both cars and factories/office buildings can be supplied with the right level of energy without disturbances.

In case such system is not deployed, companies will experiment local electricity shutdown or significant raise in electricity costs that will degrade their overall performance. In particular, in some countries, production is planned to be delocalized as energy cost is dramatically increasing.

To solve this issue, electrical grid companies propose to build new electrical lines (e.g., bigger ones) and to increase the contract signed with their customers to avoid any shutdown. However, this solution is not sustainable at scale as it would mean to renew most of the electrical grid elements in large geographical areas.

It is therefore an object of at least one embodiment of the invention to provide solution that allows to remedy at least partially to these drawbacks.

BRIEF SUMMARY OF THE INVENTION

To this end, at least one embodiment of the invention concerns a method for managing the charge of a plurality of vehicles on a site, said site comprising a plurality of charging points and a gateway, said gateway being connected between an electricity grid of an electricity provider, configured to provide electricity to said gateway, and said plurality of charging points, the gateway comprising a control module and an energy module for storing electrical energy, said method, operated by the control module, comprising the steps of:

determining the electricity need of the plurality of charging points at a given time, if the electricity need of the plurality of charging points is greater than zero, determining the electrical consumption of the site, if the electrical consumption of the site is greater than a predetermined site limit, providing electrical energy to the plurality of charging points using electricity at least partially received from the energy module.

The method according to one or more embodiments of the invention allows to optimize the electricity consumption and distribution on the site. In particular, in at least one embodiment, the gateway helps managing downfalls or shortage of electricity on the electrical grid, especially when many vehicles are connected at the same time on the site or different sites.

In parallel to that increase of number of electrical vehicles, an increase of used batteries that are no longer performant for the transport industry but with still an interesting storage capacity may be expected. The recycling or upcycling of those batteries is a real challenge for automotive companies as it induces costs and environmental concerns.

In at least one embodiment, electricity may be provided to the plurality of charging points using electricity integrally received from the electrical grid.

Alternatively, in one or more embodiments, electricity may be provided to the plurality of charging points using electricity received from the electrical grid and another providing module, such as e.g., a local electricity production module of the site.

Alternatively, in one or more embodiments, electricity may be provided to the plurality of charging points using electricity received from another providing module, such as e.g., a local electricity production module of the site.

In at least one embodiment, the method further comprises a step of, if the electrical consumption of the site is smaller than the predetermined site limit, providing electricity to the plurality of charging points using electricity at least partially received from the electrical grid.

In one or more embodiments, providing electricity to the plurality of charging points using electricity integrally received from the electrical grid.

In at least one embodiment, the method further comprises a step of, if the electricity need of the plurality of charging points is equal to zero, determining an estimate of the electricity need of the site for a predetermined upcoming interval of time, e.g., for vehicles and/or facilities (e.g., building) of the site.

In at least one embodiment, the site comprising facilities that consume electricity and that are connected to the gateway, the method further comprises a step of, if the sum of the estimate of the electricity need of the site and of the actual electrical consumption is smaller than the predetermined site limit and if said facilities need electricity, providing electricity to said facilities using the energy module.

In at least one embodiment, the site comprising facilities that consume electricity and that are connected to the gateway, the method further comprises a step of, if the sum of the estimate of the electricity need of the site and of the actual electrical consumption is smaller than the predetermined site limit and if said facilities does not need electricity, determining the electricity grid provider buying price rate and, if the determined electricity grid provider buying price rate is below a predetermined buying price rate threshold, providing electricity to the electrical grid.

Facilities may comprise one or several buildings and/or any premises that need to be electrically powered.

In at least one embodiment, the site comprises at least one local electricity production module.

In at least one embodiment, the step of providing electricity to the electrical grid comprises providing electricity to the electrical grid using the energy module and/or, if the site comprises a local electricity production module, using said local electricity production module.

In at least one embodiment, the estimate of the electricity need of the site is based on a forecast of electricity demand from vehicles and facilities of the site.

In at least one embodiment, the method further comprises a step, prior to determining the electricity need of the plurality of charging points at a given time, of determining the load status of the energy module and determining the electricity need of the plurality of charging points at a given time only if the load status of the energy module is not empty, preferably is full.

In at least one embodiment, the method further comprises a step, of, if the load status of the energy module is empty, determining an actual or planned consumption of electricity on the site for a predetermined upcoming interval of time.

In at least one embodiment, the site comprising at least one local electricity production module configured to produce and store electricity, the method further comprises a step of, if an actual or planned consumption of electricity on the site is determined, receiving electricity from the local electricity production module to charge the energy module.

The local electricity production module may be for example a solar system (e.g., photovoltaic panels), wind turbine, etc.

In at least one embodiment, the method further comprises a step of, if there is no actual or planned consumption of electricity on the site, determining the electricity grid provider selling price rate and, if the determined electricity grid provider selling price rate is below a predetermined selling price rate threshold, receiving electricity from the electrical grid to charge the energy module.

In at least one embodiment, the step of determining the electricity grid provider selling price rate is performed based on the actual and forecasted electricity rates.

One or more embodiments of the invention also relates to a computer program comprising instructions which, when the program is executed by a processor, cause the processor to carry out the steps of the method as presented before.

At least one embodiment of the invention also relates to a gateway for managing the charge of a plurality of vehicles on a site, said site comprising a plurality of charging points and said gateway, the gateway being connected between an electricity grid, configured to provide electricity, and said plurality of charging points, the gateway comprising a control module and an energy module, said energy module being configured to store electrical energy, said control module being configured to perform the method as presented before.

In particular, at least one embodiment of the invention relates to a gateway for managing the charge of a plurality of vehicles on a site, said site comprising a plurality of charging points and said gateway, said gateway being connected between an electricity grid of an electricity provider, configured to provide electricity to said gateway, and said plurality of charging points, the gateway comprising a control module and an energy module, said energy module being configured to store electrical energy, said control module being configured to:

determine the electricity need of the plurality of charging points at a given time, determine the electrical consumption of the site when the electricity need of the plurality of charging points is greater than zero, control the gateway in order to provide electrical energy to the plurality of charging points using electricity at least partially received from the energy module when the electrical consumption of the site is greater than a predetermined site limit.

In at least one embodiment, the control module is configured to control the gateway in order to provide electrical energy to the plurality of charging points using electricity integrally received from the energy module.

In at least one embodiment, the control module is configured to control the gateway in order to provide electricity to the plurality of charging points using electricity at least partially received from the electrical grid when the electrical consumption of the site is smaller than the predetermined site limit.

In one or more embodiments, providing electricity to the plurality of charging points using electricity integrally received from the electrical grid.

Alternatively, in at least one embodiment, electricity may be provided to the plurality of charging points using electricity received from the electrical grid and another providing module, such as e.g., a local electricity production module of the site.

Alternatively, in one or more embodiments, electricity may be provided to the plurality of charging points using electricity received from another providing module, such as e.g., a local electricity production module of the site.

In at least one embodiment, the gateway is further configured to determine an estimate of the electricity need of the site for a predetermined upcoming interval of time when the electricity need of the plurality of charging points is equal to zero.

The estimate of the electricity need of the site is a forecast of electricity consumption of the site, in particular e.g., by vehicles and/or facilities (e.g., buildings) of the site.

In at least one embodiment, the site comprising facilities that consume electricity and that are connected to the gateway, the gateway is further configured to provide electricity to said facilities using the energy module when the sum of the estimate of the electricity need of the site and of the actual electrical consumption is smaller than the predetermined site limit and said facilities need electricity.

The facilities may comprise for example one or more buildings and/or any premises that need to be powered by electricity.

In at least one embodiment, the site comprises a local electricity production module that may be used to charge the energy module and/or to power some of the facilities of the site with electricity.

In at least one embodiment, the site comprising facilities that consume electricity and that are connected to the gateway, the gateway is further configured to determine the electricity grid provider buying price rate when the sum of the estimate of the electricity need of the site and of the actual electrical consumption is smaller than the predetermined site limit and said facilities does not need electricity and provide electricity to the electrical grid when the determined electricity grid provider buying price rate is below a predetermined buying price rate threshold.

In at least one embodiment, the gateway is configured to provide electricity to the electrical grid using the energy module and/or, when the site comprises a local electricity production module, using said local electricity production module.

In at least one embodiment, the gateway is configured to estimate the electricity need of the site based on a forecast of electricity demand from vehicles and facilities of the site.

In at least one embodiment, the gateway is configured to, prior to determine the electricity need of the plurality of charging points at a given time, determine the load status of the energy module and the electricity need of the plurality of charging points at a given time only when the load status of the energy module is not empty, preferably is full.

In at least one embodiment, the gateway is configured to determine an actual or planned consumption of electricity on the site for a predetermined upcoming interval of time when the load status of the energy module is empty.

In at least one embodiment, the site further comprising at least one local electricity production module configured to produce and store electricity, the gateway is configured to receive electricity from the local electricity production module to charge the energy module when an actual or planned consumption of electricity on the site is determined.

The local electricity production module may e.g., be a solar system (e.g., photovoltaic panels), a wind turbine, or any other adapted module that is configured to produce electricity.

In one or more embodiments, the gateway is further configured to determine the electricity grid provider selling price rate when there is no actual or planned consumption of electricity on the site, and, to receive electricity from the electrical grid to charge the energy module when the determined electricity grid provider selling price rate is below a predetermined selling price rate threshold.

In one or more embodiments, the gateway is configured to determine the electricity grid provider selling price rate based on the actual and forecasted electricity rates.

At least one embodiment of the invention also relates to a site comprising a plurality of charging points and a gateway as presented before connected to said plurality of charging points.

At least one embodiment of the invention also relates to a charging system comprising a site as presented before and an electrical grid connected to the gateway.

At least one embodiment of the invention also relates to a charging system comprising a site as presented before, an electrical grid connected to the gateway and at least one vehicle connected to a charging point of the site.

BRIEF DESCRIPTION OF THE DRAWINGS

These and other features, aspects, and advantages of one or more embodiments of the invention are better understood with regard to the following Detailed Description of the Invention, Claims, and accompanying Figures, where:

DETAILED DESCRIPTION OF THE INVENTION

Figure 1:
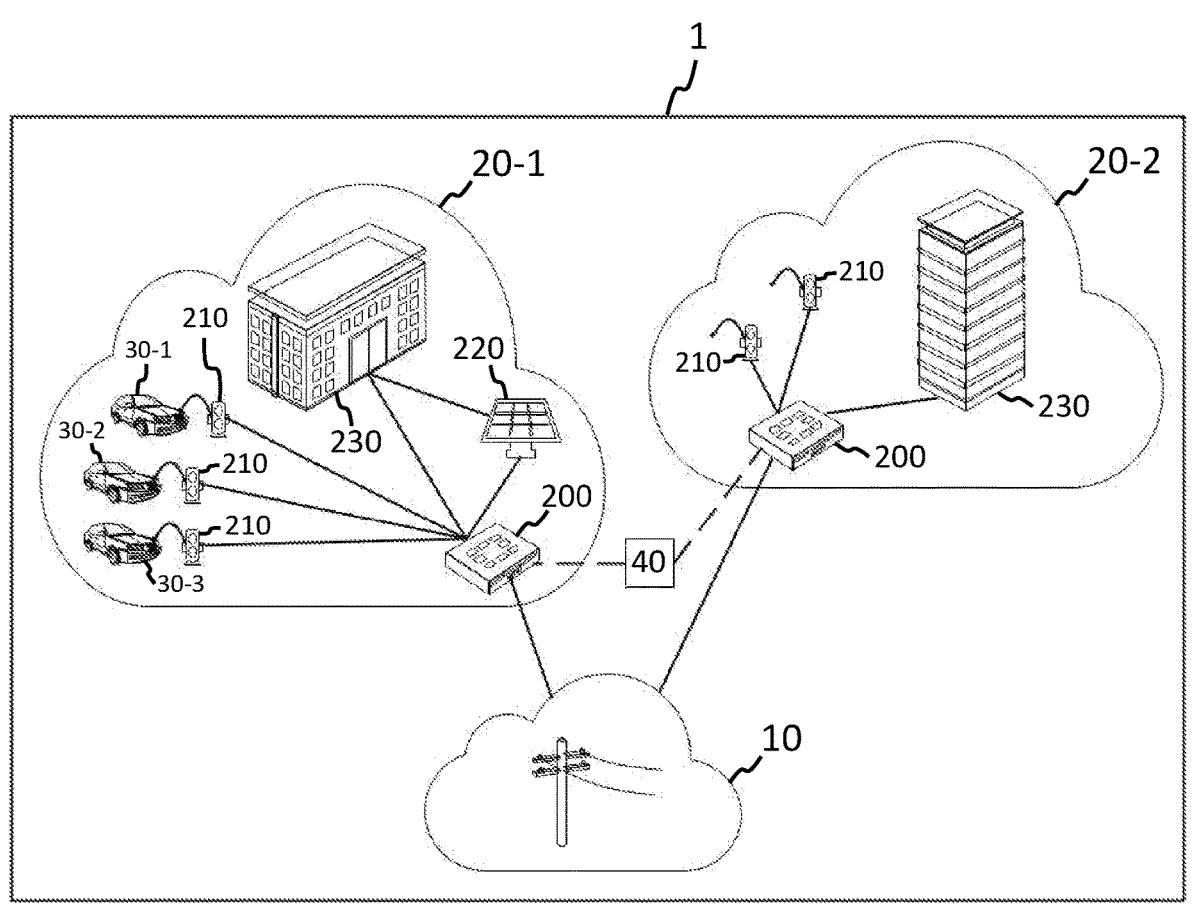
FIG. 1 schematically illustrates an example of the charging system according to one or more embodiments of the invention.

The disclosure, which includes the Brief Summary of Invention, Brief Description of the Drawings and the Detailed Description of the Invention, and the Claims refer to particular features (including process or method steps) of at least one embodiment of the invention. Those of skill in the art understand that the one or more embodiments of the invention includes all possible combinations and uses of particular features described in the disclosure. Those of skill in the art understand that the at least one embodiment of the invention is not limited to or by the description of the one or more embodiments of the invention. The inventive subject matter is not restricted except only in the spirit of the disclosure and claims. Those of skill in the art also understand that the terminology used for describing the one or more embodiments does not limit the scope or breadth of the invention. In interpreting the disclosure and claims, all terms should be interpreted in the broadest possible manner consistent with the context of each term. All technical and scientific terms used in the disclosure and claims have the same meaning as commonly understood by one of ordinary skill in the art to which this invention belongs unless defined otherwise. As used in the disclosure, the singular forms "a", "an", and "the" include plural references unless the context clearly indicates otherwise. The verb "comprises", and its conjugated forms should be interpreted as referring to elements, components or steps in a non-exclusive manner. The referenced elements, components or steps may be present, utilized or combined with other elements, components or steps not expressly referenced. The verb "couple" and its conjugated forms means to complete any type of required junction, including electrical, mechanical or fluid, to form a singular object from two or more previously non-joined objects. If a first device couples to a second device, the connection can occur either directly or through a common connector. "Optionally" and its various forms means that the subsequently described event or circumstance may or may not occur. The description includes instances where the event or circumstance occurs and instances where it does not occur. "Operable" and its various forms means fit for its proper functioning and able to be used for its intended use. Spatial terms describe the relative position of an object or a group of objects relative to another object or group of objects. Where the disclosure provides a range of values, it is understood that the interval encompasses each intervening value between the upper limit and the lower limit as well as the upper limit and the lower limit. At least one embodiment of the invention encompasses and bounds smaller ranges of the interval subject to any specific exclusion provided. Where the disclosure references a method comprising two or more defined steps, the defined steps can be carried out in any order or simultaneously except where the context excludes that possibility.

Reference will now be made in detail to one or more embodiments or features, examples of which are illustrated in the accompanying drawings. Wherever possible, corresponding or similar reference numbers will be used throughout the drawings to refer to the same or corresponding parts. Moreover, references to various elements described herein are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the claims.

FIG. 1 describes an example of the charging system 1 according to one or more embodiments of the invention.

The system 1 comprise an electrical grid 10, two sites 20-1, 20-2, and three vehicles 30-1, 30-2, 30-3. Of course, in at least one embodiment, the system 1 could comprise more than one electrical grid 10, more or less than two sites 20-1, 20-2, and more or less than three vehicles 30-1, 30-2, 30-3.

In the example of FIG. 1, the system 1 also comprises a global gateway manager 40.

Electrical Grid 10

The electrical grid 10 is configured to provide electricity to the sites 20-1, 20-2. The electrical grid 10 is a domestic electricity network. The electrical grid 10 is managed by a provider. In this example, by way of at least one embodiment, the electrical grid 10 sells electricity to the sites 20-1, 20-2 based on different selling price rates, e.g., depending on the time of the day or any specific subscription. In this example, by way of at least one embodiment, the electrical grid 10 can buy electricity from the sites 20-1, 20-2 based on different buying price rates, e.g., depending on the time of the day or any specific subscription.

Sites 20-1, 20-2

Each site 20-1, 20-2 comprises a gateway 200 and a plurality of charging points 210. In the example of FIG. 1, the first site 20-1 also comprises a local electricity production module 220.

Gateway 200

The gateway 200 is connected on one hand to the electrical grid 10 and on another end to the charging points 210 of the site 20-1, 20-2.

Figure 2:
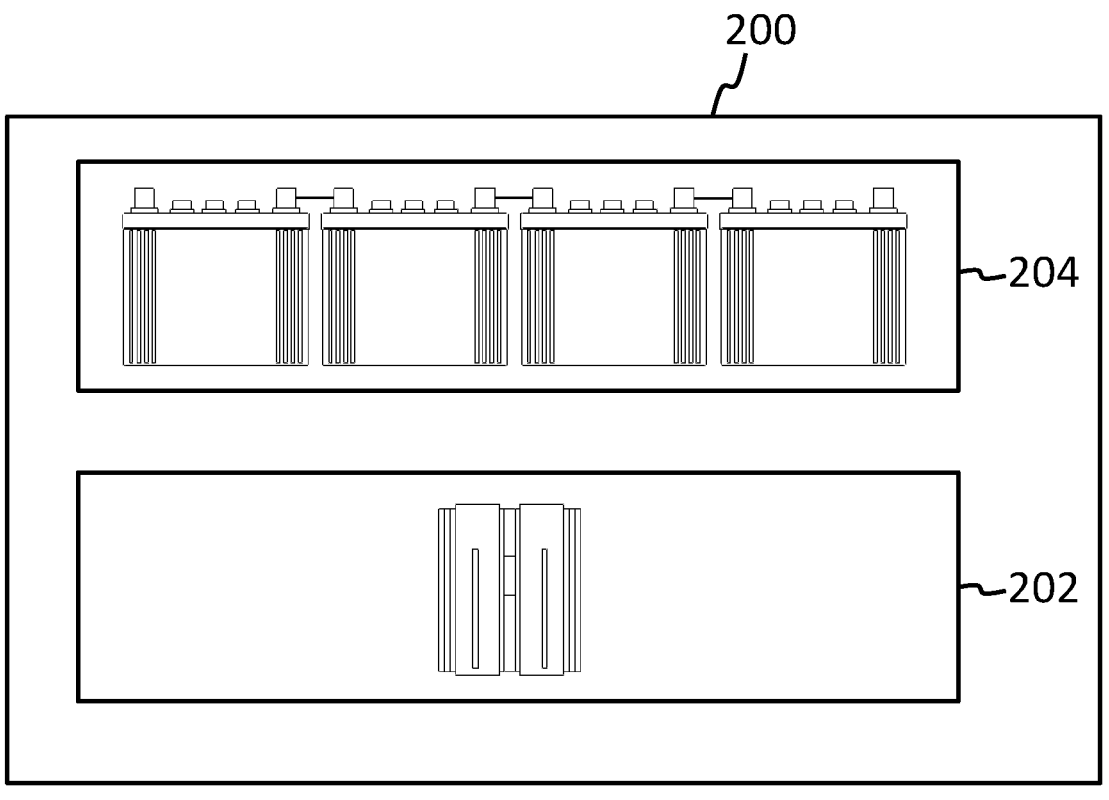
FIG. 2 schematically illustrates an example of the gateway according to one or more embodiments of the invention.
Figure 3:
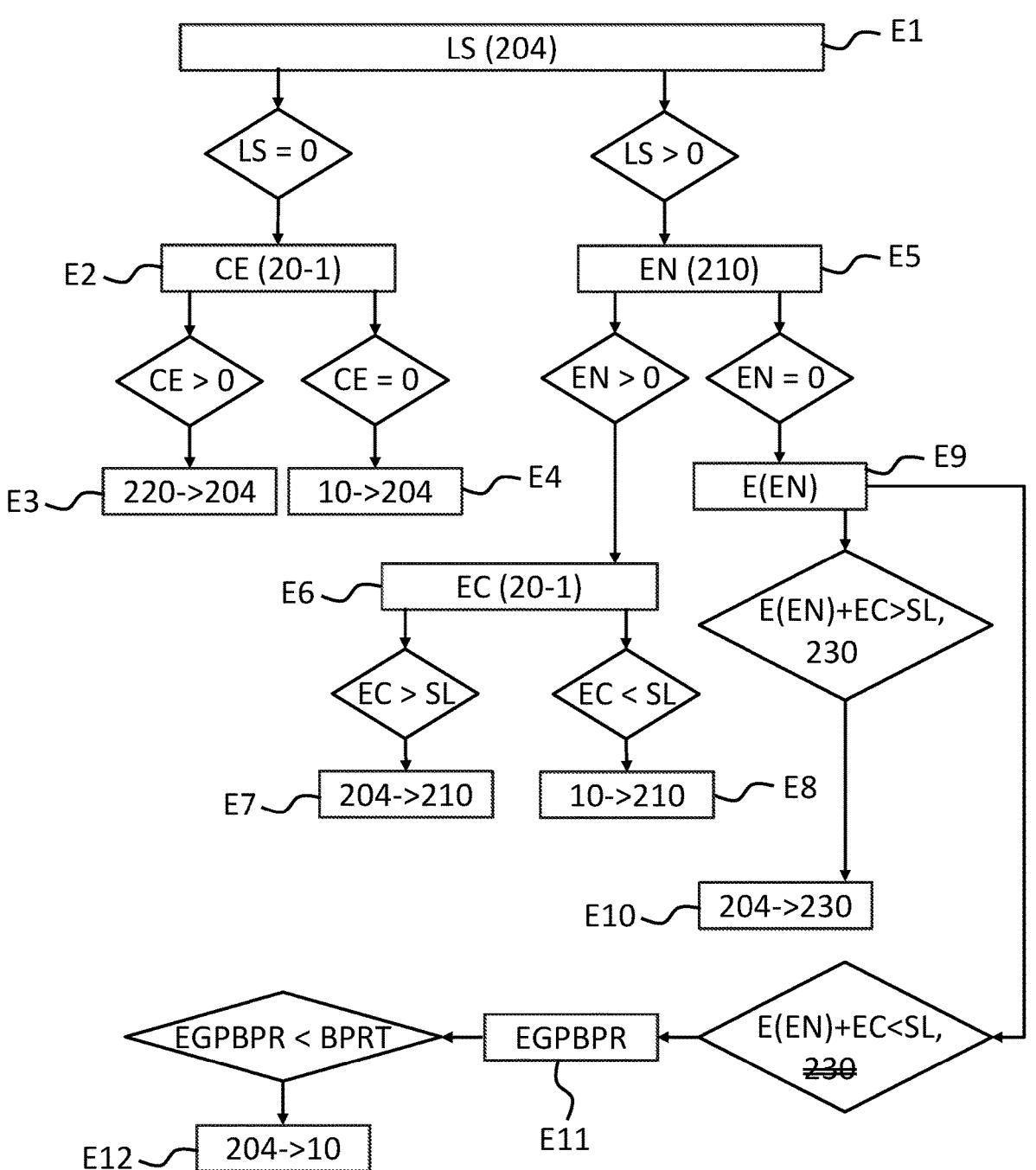
FIG. 3 schematically illustrates an example of the method according to one or more embodiments of the invention.

As illustrated in FIG. 2, the gateway 200 comprises a control module 202 and an energy module 204, according to one or more embodiments of the invention.

The control module 202 is configured to determine the electricity need of the plurality of charging points 210 of the site 20-1, 20-2 at a given time.

The control module 202 is configured to determine the electrical consumption of the site 20-1, 20-2 when the electricity need of the plurality of charging points 210 of the site 20-1, 20-2 is greater than zero.

The control module 202 is configured to provide electrical energy to the plurality of charging points 210 of the site 20-1, 20-2 using electricity at least partially received from the energy module 204 when the electrical consumption of the site 20-1, 20-2 is greater than a predetermined site limit.

The energy module 204 is configured to store electrical energy.

In at least one embodiment, the energy module 204 comprises several batteries such as e.g., lithium/ion. Advantageously, in one or more embodiments, the batteries are connected serially (i.e., in seral mode). Alternatively, in at least one embodiment, the energy module 204 may comprise any other kind of electricity storage device, such as e.g., a fuel cell or else.

In at least one embodiment, the control module 202 is configured to control the gateway 200 in order to provide electrical energy to the plurality of charging points 210 of the site 20-1, 20-2 using electricity integrally received from the energy module 204.

In at least one embodiment, the gateway 200 is configured to provide electricity to the plurality of charging points 210 of the site 20-1, 20-2 using electricity at least partially received from the electrical grid 10 when the electrical consumption of the site 20-1, 20-2 is smaller than the predetermined site limit. This provision is controlled by the control module 202.

In at least one embodiment, the gateway 200 is configured to provide electricity to the plurality of charging points 210 of the site 20-1, 20-2 using electricity integrally received from the electrical grid 10.

Alternatively, in one or more embodiments, electricity may be provided to the plurality of charging points 210 of the site 20-1, 20-2 using electricity received from the electrical grid 10 and another providing module, such as e.g., the local electricity production module of the site.

Alternatively, in one or more embodiments, electricity may be provided to the plurality of charging points 210 of the site 20-1, 20-2 using electricity received from another providing module, such as e.g., the local electricity production module 220 in the case of the first site 20-1.

In at least one embodiment, the control module 202 is configured to determine an estimate of the electricity need of the site 20-1, 20-2 for a predetermined upcoming interval of time when the electricity need of the plurality of charging points 210 of the site 20-1, 20-2 is equal to zero.

The estimate of the electricity needs of the site 20-1, 20-2 is a forecast of electricity consumption of the site 20-1, 20-2, in particular e.g., by vehicles and/or facilities (e.g., building) of the site 20-1, 20-2.

Still in reference to FIG. 1, the sites 20-1, 20-2 comprises facilities 230 that consume electricity and that are connected to their respective gateway 200.

In this case, by way of one or more embodiments, the gateway 200 may advantageously be configured to provide electricity to said facilities 230 using the energy module 204 when the sum of the estimate of the electricity needs of the site 20-1, 20-2 and of the actual electrical consumption of the site 20-1, 20-2 is smaller than the predetermined site limit and said facilities need electricity.

The facilities 230 may comprise for example one or more buildings and/or any premises that need to be powered by electricity.

The local electricity production module 220 is configured to produce electricity. The local electricity production module 220 may be used to charge the energy module 204 and/or to power some of the facilities 230 of the first site 20-1 with electricity as it will be described further.

The control module 202 is configured to determine the electricity grid provider buying price rate of the electrical grid 10 when the sum of the estimate of the electricity need of the site 20-1, 20-2 and of the actual electrical consumption of the 20-1, 20-2 is smaller than the predetermined site limit and the facilities 230 does not need electricity and to provide electricity to the electrical grid 10 when the determined electricity grid provider buying price rate is below a predetermined buying price rate threshold.

The control module 202 is configured to provide electricity to the electrical grid 10 using the energy module 204 (i.e., electricity from the energy module 204) and/or, when the site 20-1 comprises a local electricity production module 220, using said local electricity production module 220 (i.e., electricity from said local electricity production module 220).

The control module 202 is configured to estimate the electricity need of the site 20-1, 20-2 based on a forecast of electricity demand from vehicles 30-1, 30-2, 30-3 and facilities 230 of the site 20-1, 20-2.

The control module 202 is configured to, prior to determine the electricity need of the plurality of charging points 210 of the site 20-1, 20-2 at a given time, determine the load status of the energy module 204 and the electricity need of the plurality of charging points 210 of the site 20-1, 20-2 at a given time only when the load status of the energy module 204 is not empty, preferably is full.

The control module 202 is configured to determine an actual or planned consumption of electricity of the site 20-1, 20-2 for a predetermined upcoming interval of time when the load status of the energy module 204 is empty.

The control module 202 of the gateway 200 of the first site 20-1 is configured to receive electricity from the local electricity production module 220 to charge the energy module 204 when an actual or planned consumption of electricity on said first site 20-1 is determined.

The local electricity production module 220 may e.g., be a solar system (e.g., photovoltaic panels), a wind turbine, or any other adapted module that is configured to produce electricity.

The control module 202 is configured to determine the electricity grid provider selling price rate when there is no actual or planned consumption of electricity on the site 20-1, 20-2, and, to receive electricity from the electrical grid 10 to charge the energy module 204 when the determined electricity grid provider selling price rate is below a predetermined selling price rate threshold.

The control module 202 is configured to determine the electricity grid provider selling price rate based on the actual and forecasted electricity rates.

The control module 202 comprises a processor configured to carry out the steps of the method as presented before, according to one or more embodiments of the invention.
Charging Points 210

Each charging points 210 is configured to deliver electricity to a vehicle 30-1, 30-2, 30-3 when said vehicle 30-1, 30-2, 30-3 is connected and authorized.
Vehicles 30-1, 30-2, 30-3

In the example of FIG. 1, according to one or more embodiments, each vehicle 30-1, 30-2, 30-3 is connected to a charging point 210 of the first site 20-1.
Global Gateway Manager 40

The global gateway manager 40 enables the data exchange between several gateways 200 to synchronize the energy management and anticipate peak loads or energy demand.
Example of Operation for the Gateway 200 of the First Site 20-1

In a step E1, at a given time, the control module 202 determines the load status LS of the energy module 204.

If the load status of the energy module 204 is empty, the control module 202 determines in a step E2 the actual or planned consumption of electricity CE of the first site 20-1 for a predetermined upcoming interval of time, e.g., the next hour.

If an actual or planned consumption of electricity CE of the first site 20-1 is determined (i.e. if the first site 20-1 currently needs electricity or will need electricity in the next predetermined upcoming interval of time), the control module 202 controls the gateway 200 in a step E3 in order to receive electricity from the local electricity production module 220 to charge the energy module 204 or to supply power to the facilities 230 of the first site 20-1.

If there is no actual or planned consumption of electricity on the first site 20-1, the control module 202 determines the electricity grid provider selling price rate and, if the determined electricity grid provider selling price rate is below a predetermined selling price rate threshold, the control module 202 controls the gateway 200 in a step E4 in order for the gateway 200 to receive electricity from the electrical grid 10 to charge the energy module 204. The control module 202 determines the electricity grid provider selling price rate based on the actual and forecasted electricity rates.

If the load status LS of the energy module 204 is not empty, preferably is full, the control module 202 determines in a step E5 the electricity need EN of the charging points 210 at the given time.

If the electricity needs EN of the charging points 210 of the first site 20-1 is greater than zero, the control module 202 determines in a step E6 the electrical consumption EC of said first site 20-1.

If the electrical consumption EC of the first site 20-1 is greater than a predetermined site limit SL, the control module 202 controls the gateway 200 in a step E7 in order for the gateway 200 to provide electrical energy to the charging points 210 using electricity at least partially received from the energy module 204, optionally combined with electricity coming from another providing module, such as e.g. the local electricity production module 220.

If the electrical consumption EC of the first site 20-1 is smaller than the predetermined site limit SL, the control module 202 controls the gateway 200 in a step E8 in order for the gateway 200 to provide electricity to the charging points 210 using electricity at least partially received from the electrical grid 10.

Electricity may be provided to the charging points 210 using electricity integrally received from the electrical grid 10. Alternatively, electricity may be provided to the charging points 210 using electricity received from another providing module, such as e.g., the local electricity production module 220.

If the electricity needs EN of the plurality of charging points 210 is equal to zero, the control module 202 determines in a step E9 an estimate of the electricity need E (EN) of the first site 20-1 for a predetermined upcoming interval of time. Such estimate may be based on forecast of electricity consumption for vehicles charging and/or facilities (e.g., building) of the first site 20-1.

If the sum of the estimate of the electricity need E (EN) of the first site 20-1 and of the actual electrical consumption EC of the site 20-1 is smaller than the predetermined site limit SL and if said facilities 230 need electricity, the control module 202 controls in a step E10 the gateway 200 to provide electricity to said facilities 230 using electricity from the energy module 204.

If the sum of the estimate of the electricity need E (EN) of the first site 20-1 and of the actual electrical consumption EC is smaller than the predetermined site limit SL and if said facilities 230 does not need electricity, the control module 202 determines in a step E11 the electricity grid provider buying price rate EGPBPR and, if the determined electricity grid provider buying price rate EGPBPR is below a predetermined buying price rate threshold BPRT, the control module 202 controls in a step E12 the gateway 200 to provide electricity to the electrical grid 10 using electricity from the energy module 204.

The step E12 of providing electricity to the electrical grid 10 may comprise providing electricity to the electrical grid 10 using the energy module 204 and/or using said local electricity production module 220.

The method would mutatis mutandis applies similarly for the gateway 200 of the second site 20-2, according to at least one embodiment.

The method, by way of one or more embodiments, allows to provide electrical energy to the plurality of charging points 210 in a simple, fast and efficient manner using electricity at least partially received from the energy module 204. The energy module 204 allows to store electrical energy to return it when needed.

The invention claimed is:

1. A method of managing a charge of a plurality of vehicles on a site, said site comprising a plurality of charging points, a gateway and facilities that consume electricity and are connected to said gateway, the gateway being connected between an electrical grid of an electricity provider, configured to provide the electricity to said gateway, and said plurality of charging points, the gateway comprising a controller and an electrical storage device that stores electrical energy, said method, operated by the controller, comprising: determining an electricity need of the plurality of charging points at a given time, wherein if the electricity need of the plurality of charging points is greater than zero, determining an electrical consumption of the site, wherein if the electrical consumption of the site is greater than a predetermined site limit, providing said electrical energy to the plurality of charging points using the electricity at least partially received from the electrical storage device; further comprising, wherein if the electricity need of the plurality of charging points is equal to zero, determining an estimate of the electricity need of the site for a predetermined upcoming interval of time; wherein the site further comprises the facilities that consume the electricity and that are connected to the gateway, wherein the method further comprises, if a sum of the estimate of the electricity need of the site and of an actual electrical consumption is smaller than the predetermined site limit and if said facilities need the electricity, providing the electricity to said facilities using the electrical storage device.

2. The method according to claim 1, further comprising, wherein if the electrical consumption of the site is smaller than the predetermined site limit, providing the electricity to the plurality of charging points using the electricity at least partially received from the electrical grid.

3. The method according to claim 1, wherein the site further comprises the facilities that consume the electricity and that are connected to the gateway, wherein the method further comprises, if a sum of the estimate of the electricity need of the site and of actual electrical consumption is smaller than the predetermined site limit and if said facilities do not need the electricity, determining an electricity grid provider buying price rate and, if the electricity grid provider buying price rate that is determined is below a predetermined buying price rate threshold, providing the electricity to the electrical grid.

4. The method according to claim 3, wherein the estimate of the electricity need of the site is based on a forecast of electricity demand from vehicles and the facilities of the site.

5. The method according to claim 1, further comprising, prior to said determining the electricity need of the plurality of charging points at the given time, determining a load status of the electrical storage device and determining the electricity need of the plurality of charging points at the given time only if the load status of the electrical storage device is not empty.

6. The method according to claim 5, further comprising, if the load status of the electrical storage device is empty, determining an actual or planned consumption of the electricity on the site for a predetermined upcoming interval of time.

7. The method according to claim 6, wherein the site further comprises at least one local electricity production device configured to produce and store the electricity, said method further comprising, if the actual or planned consumption of the electricity on the site is determined, receiving the electricity from the at least one local electricity production device to charge the electrical storage device.

8. The method according to claim 5, further comprising, if there is no actual or planned consumption of the electricity on the site, determining an electricity grid provider selling price rate and, if the electricity grid provider selling price rate that is determined is below a predetermined selling price rate threshold, receiving the electricity from the electrical grid to charge the electrical storage device.

9. The method according to claim 8, wherein the determining the electricity grid provider selling price rate is performed based on actual and forecasted electricity rates.

10. A non-transitory computer program comprising instructions which, when the non-transitory computer program is executed by a processor, cause the processor to carry out a method of managing a charge of a plurality of vehicles on a site, said site comprising a plurality of charging points, a gateway and facilities that consume electricity and are connected to said gateway, the gateway being connected between an electrical grid of an electricity provider, configured to provide the electricity to said gateway, and said plurality of charging points, the gateway comprising a controller and an electrical storage device that stores electrical energy, said method, operated by the controller, comprising:

determining an electricity need of the plurality of charging points at a given time, wherein if the electricity need of the plurality of charging points is greater than zero, determining an electrical consumption of the site, wherein if the electrical consumption of the site is greater than a predetermined site limit, providing said electrical energy to the plurality of charging points using the electricity at least partially received from the electrical storage device.

11. A charging system comprising:

a site comprising a plurality of charging points;

a gateway connected to said plurality of charging points, wherein the gateway comprises a controller and an electrical storage device, said electrical storage device being configured to store electrical energy, wherein said controller is configured to manage a charge of a plurality of vehicles on said site, provide electricity to said gateway and said plurality of charging points, determine an electricity need of the plurality of charging points at a given time, wherein if the electricity need of the plurality of charging points is greater than zero, determine an electrical consumption of the site, wherein if the electrical consumption of the site is greater than a predetermined site limit, provide said electrical energy to the plurality of charging points using the electricity at least partially received from the electrical storage device; and facilities that consume the electricity and are connected to said gateway; and, an electrical grid connected to the gateway and configured to provide the electricity, wherein the gateway is connected between the electrical grid.

* * * * *